May 26, 1964

C. W. HELM 3,134,580

TUNNEL MACHINE

Filed July 7, 1961

INVENTOR.
CLAUDE W. HELM
BY
ATTORNEY

INVENTOR.
CLAUDE W. HELM
BY
ATTORNEY

INVENTOR.
CLAUDE W. HELM

3,134,580
TUNNEL MACHINE
Claude W. Helm, Dearborn, Mich., assignor to Mid-States Tool & Manufacturing Company, Southfield, Mich., a company of Michigan
Filed July 7, 1961, Ser. No. 122,469
9 Claims. (Cl. 262—7)

The present invention relates to a new and improved machine for boring or tunneling within the earth. The subject machine is of the type which includes a cylindrical casing member of a diametral size which determines the size of hole to be bored. The machine includes means adapted to move the casing member axially toward the surface to be bored or cut.

A cutting device is rotatably supported within said cylindrical casing member and is of substantially less diametral size than said member. The cutting device is concentrically mounted within the casing member and is adapted to be movable axially relative thereto.

During normal operation the front or cutting face of the cutting device is substantially flush with the forward or leading edge of the cylindrical casing. However, the cutting device is adapted to be retracted within the casing primarily for the purpose of permitting servicing of the device and more specifically for the repair of replacement of individual cutting elements mounted on the device.

An annular sleeve or collar member having a frusto-conical or inwardly inclined leading face is fixedly and concentrically mounted within the cylindrical casing. Thus, as the supporting casing is moved axially toward the surface to be bored, the cutting device will remove earth along its rotating diameter while the inclined face of the annular collar will shear off the earth between the casing and the periphery of the rotating cutting device.

The rotatable cutting element includes a rim member having a plurality of circumferentially spaced openings formed therein which permits the earth trapped between the rim and the casing member to pass through the rim and onto a conveyor mechanism which carries the earth axially rearwardly away from the cutting surfaces.

The details as well as other objects and advantages of the present invention will be apparent from a perusal of the detail description which follows.

Figure 1:
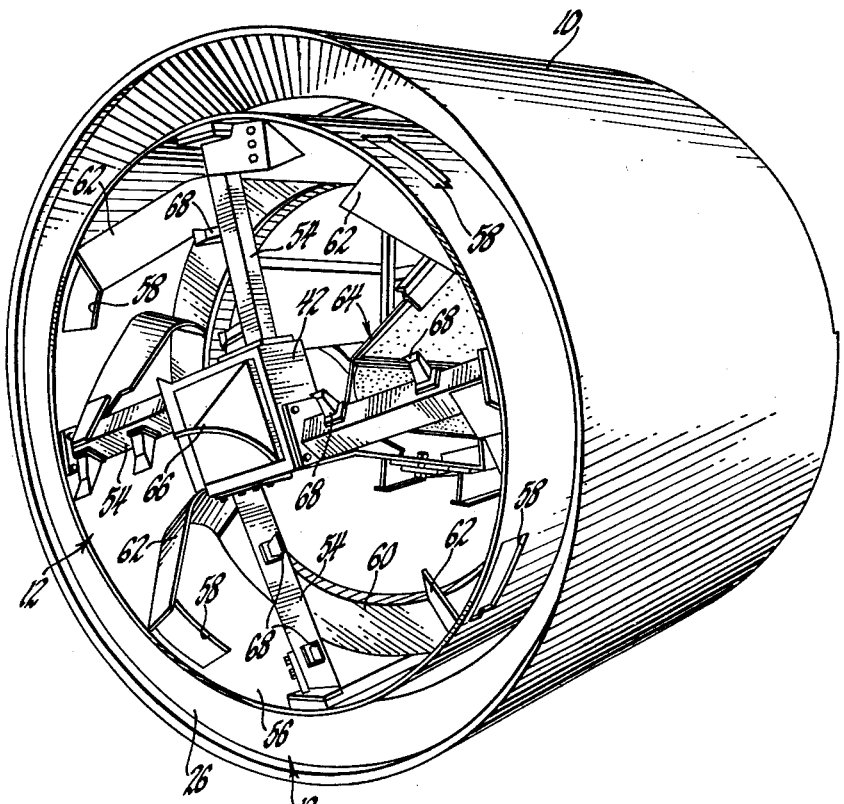
FIGURE 1 is a perspective view of the front of the subject tunneling mechanism.

The tunneling machine includes a non-rotatable cylindrical casing 10 within which a rotatable cutting device indicated generally at 12 is supported on vertical and cross beams 14 and 16.

An annular sleeve or collar member 18 is fixed within casing 10 near the forward or leading edge thereof. Collar or sleeve member 18 is fabricated from a plurality of cylindrical members 20 and 22 which are secured at their rear edges to an annular backing plate member 24. A frusto-conical or inwardly tapering member 26 is secured to the forward edges of the cylindrical members 20 and 22 to provide a tapered cutting edge which moves axially forwardly as cylindrical casing 10 is so moved.

A second annular backing plate 28 is secured to the rear end of casing 10. A plurality of generally circumferentially spaced power pistons 30 are mounted between backing plates 24 and 28. While only a few of the power pistons 30 are shown in the drawings, it is intended that they will be symmetrically spaced around casing 10. With the size tunneling machine illustrated, ten such pistons would be utilized. Each of the power pistons includes a cylinder 32 fixed between plates 24 and 28, a piston 33, a movable piston rod 34 and an end plate or foot 36 fixed thereto. In order to move the cylindrical casing 10 and hence cutting device 12 forwardly into engagement with the surface to be cut, foot or end plates 36 of power pistons 30 are adapted to seat against any suitable reaction surface, such as a shoring structure, built up or otherwise placed behind the casing. Simultaneous energization of the power pistons will cause the piston rods 34 to elongate relative to piston cylinders 32 thereby forcing casing 10 to move forwardly against the earth surface to be cut.

An axially extending supporting member or hub 38 is mounted on beams 14 and 16 so as to be coaxially disposed within casing 10. A non-rotatable shaft 40 is slidably disposed within hub 38 and in turn has a rotatable hub 42 mounted on its forward end. Hub members 38 and 42 respectively have suitable journal bearing sleeves 44 and 46 mounted on the inner surfaces thereof to accommodate sliding and rotation respectively.

The rotating hub supporting end of shaft 40 is of reduced diameter to provide a shoulder 48 against which hub thrust is transmitted to the shaft and beams 14 and 16 by members 50 and 52 disposed within a recessed portion of said hub.

Figure 2:
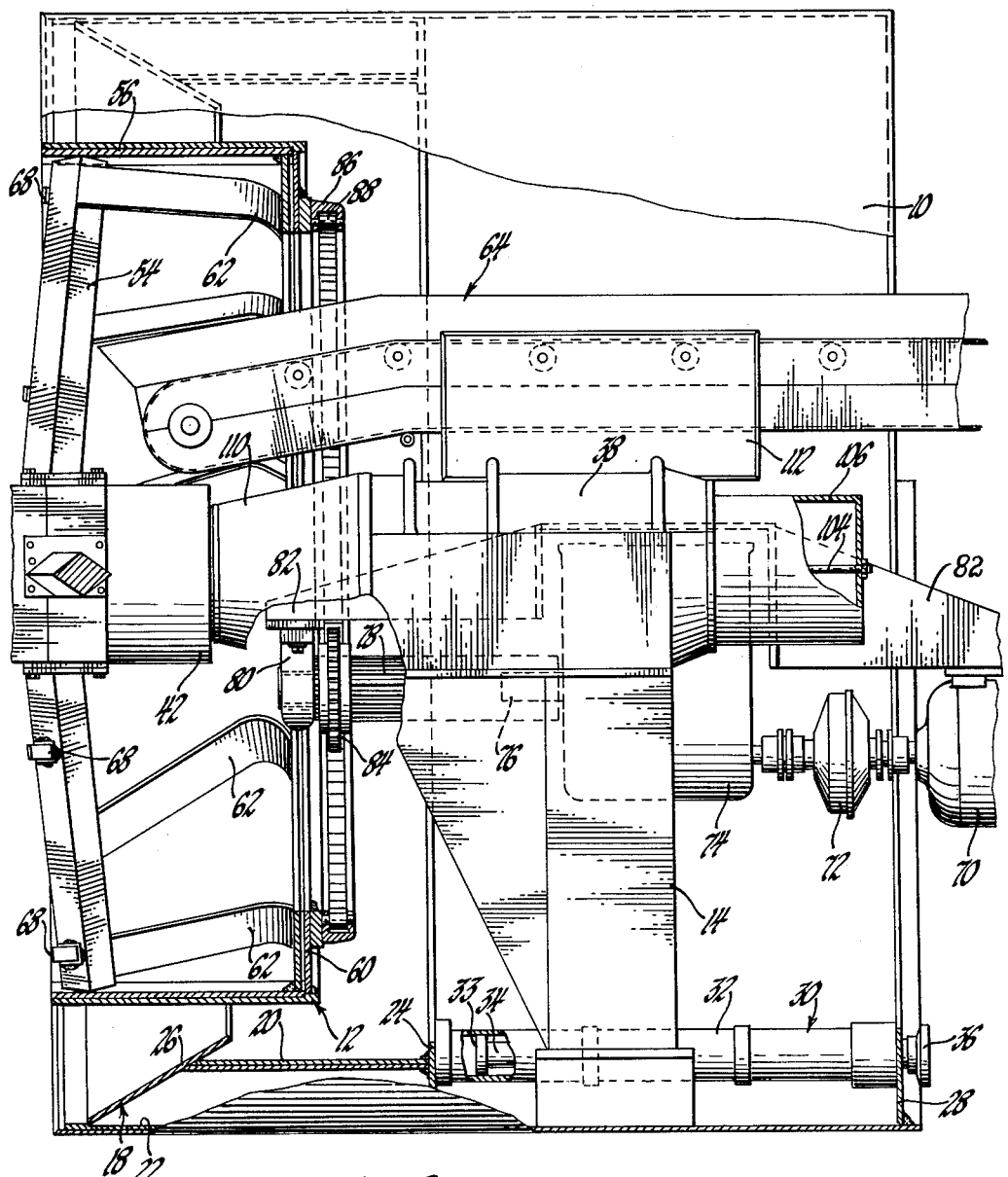
FIGURE 2 is a partially sectioned elevational view of the subject machine.

As best seen in FIGURES 1 and 2, strut members 54 extend outwardly from and are supported by hub 42. The other ends of struts 54 support a rim member 56 which extends rearwardly within casing 10 and overlays hub 42, a portion of shaft 40 and terminates axially proximate hub 38. Rim 56 includes circumferentially spaced openings 58 which are adapted to permit dirt entrapped between the rim and inclined face 26 of collar 18 to pass within the rotating cutting element to facilitate its removal by means to be discussed subsequently.

An annular backing plate 60 is secured to the rear edge of rim 56. A plurality of forwardly opening scoop members 62 are secured to the inner surface of rim 56 and have their rear edges closed by backing plate 60. Scoops 62 are adapted to pick up the loose earth or dirt and carry the same for discharge into a conveyor mechanism indicated generally at 64.

A boring member 66 is mounted on the front of hub 42. Additional cutting elements 68 are mounted on and spaced along struts 54. Member 66, elements 68 and tapered member 26 provide the main cutting surfaces of the tunneling machine. It is apparent that member 66 and elements 68 may be damaged in operation, hence these parts are removably secured to their supporting members.

An important aspect of the present tunneling machine is the means for rotatably driving cutter device 12. With previous type tunneling machines it has been common practice to drive the rotatable cutting device by providing power into a coaxial driving shaft or hub. This type of an arrangement frequently has complicated the tunneling machine so as to make it difficult to remove the dirt and also has made access to the front of the cutting tool to repair the cutting elements very difficult if not impossible without complete backing out or removal of the tunneling machine.

In the present instance, a rim or sprocket drive arrangement has been uniquely provided which improves the dirt removing capabilities of the machine as well as facilitating easy repair of the cutting elements. A motor is provided at 70 and drives through a coupling device 72 to a speed reducing mechanism 74 which in turn includes an output shaft 76 to which a splined drive shaft 78 is secured. A pillow block type journal bearing 80 is mounted upon a bracket member 82 which is in turn secured to cross beam 16. The bracket member 82 extends forwardly and rearwardly of the cross beams 14 and 16, as best shown in the dotted outline in FIGURE 2 and supports the motor 70 and speed reducing means 74 on the aft end thereof. Bearing 80 is adapted to rotatably support the other end of splined shaft 78. A gear member 84 is internally splined for slidably mounting on splined shaft 78. Thus, while gear 84 rotates with shaft 78 it is also axially movable relative thereto, infra.

Figure 4:
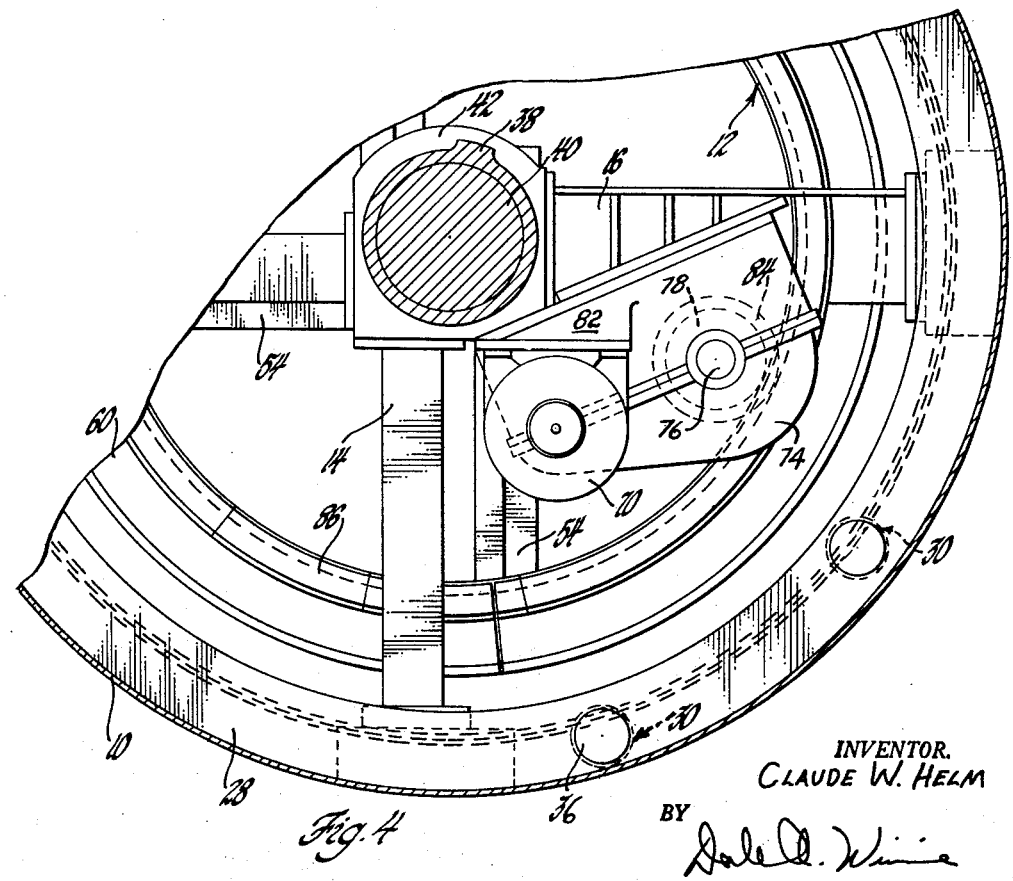
FIGURE 4 is substantailly an end view of the tunnel machine shown by FIGURES 1 and 2.

A rim 86 is fixed to backing plate 60 of rotatable cutting device 12 and is recessed to support a plurality of pin members 88 which are drivingly engaged by gear member 84. Thus, rim 86 and pin members 88 provide an internal gear member through which cutting device 12 is adapted to be rotated by gear 84. As best seen in FIGURE 4, the rim driving arrangement for the rotatable cutting device permits the power train to be disposed off to one side and below shaft 40 thereby leaving the remainder of the rotatable cutting element relatively free for servicing access as well as dirt removal. Viewed otherwise, the space within cylindrical casing 10 may be divided into four quadrants, again referring to FIGURE 4, with the power mechanism for driving cutting device 12 being disposed essentially in one quadrant and leaving the other three quadrants relatively open.

Figure 3:
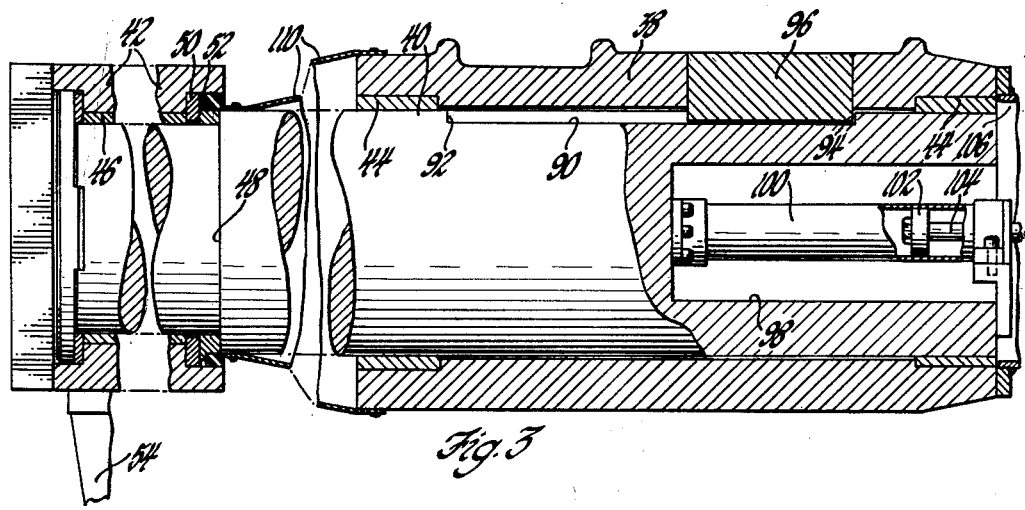
FIGURE 3 is a partially sectioned detail view of the rotatable cutter retracting mechanism.

In order to permit servicing of member 66 and the individual cutting elements 68 mounted on struts 54, rotatable cutting device 12 is supported in such a way as to be retractable within casing 10. Referring now to FIGURE 3, it will be seen that a keyway 90 is formed in shaft 40 to provide stop shoulders 92 and 94. A key member 96 is fixed within hub 38 and is adapted to project within keyway 90 to prevent rotation of the shaft as well as to limit its axial movement. Shaft 40 is recessed at 98 and within which recess a power cylinder 100 is mounted. Referring to FIGURES 2 and 3, the inner end of the power cylinder is secured to shaft 40 whereas piston 102 through piston rod 104 is fixed to a casing member 106 which is in turn fixed to hub 38. Thus by the application of hydraulic pressure to one side or the other of piston 102, shaft 40 may be made to move forwardly or rearwardly, in relation to the front cutting edge of casing 10, and to thereby present cutting device 12 to the earth surface to be removed or to move the cutting device away from such surface to permit servicing, supra. Thus to move the rotatable cutting device 12 into position for cutting operation, hydraulic pressure would be applied to the left side of piston 102, as viewed in FIGURE 3, whereby the power piston cylinder 100 and hence shaft 40 would be moved forwardly or leftwardly to position the cutting element in the position shown in FIGURE 2. On the other hand, if it is desired to repair or replace cutting elements 68, hydraulic pressure is applied to the right side of piston 102 and, inasmuch as the right end of the power cylinder is sealed, this will cause power cylinder 100 and shaft 40 to move to the right or retracted position.

It is apparent that due to the splined connection between gear 84 and shaft 74, forward or rearward movement of cutting device 12 will in no way interrupt the driving connection to the cutting device.

In order to protect shaft 40 and associated journal sleeves from damage by dirt that might otherwise adhere thereto, a suitable flexible, e.g. neoprene, sleeve or collar 110 is fixed at one end to the forward portion of the shaft proximate rotating hub 42 and at its rear end to stationary hub 38. Thus as shaft 40 moves forwardly or rearwardly collar 110 will flex to accommodate such movement at the same time retaining the shaft in a dirt free condition.

Belt conveyor 64 is generally of conventional design, however, it is more-or-less permanently supported upon stationary hub 38 through bracket 112 to form an integral part of the tunneling machine. As best seen in FIGURE 2, the forward end of conveyor 64 projects within rim 56 and terminates proximate struts 54. In this position conveyor 64 can receive dirt from scoops 62 or through rim openings 58 when either is in a superadjacent position.

It is apparent that various structural modifications may be made in the subject tunneling machine within the intended scope of the hereinafter appended claims.

What is claimed is:

1. A tunneling machine comprising a cylindrical outer casing, a stationary hub coaxially supported within said casing, an axially adjustable and non-rotatable shaft supported within said hub and including at least one end projecting axially therebeyond, a hub rotatably supported on said shaft, a plurality of struts extending outwardly from said rotatable hub, a rim member supported upon the outer ends of said struts, said rim members extending rearwardly over said rotatable hub and shaft in the direction of said stationary hub, a plurality of cutting elements fixed to said struts for engaging the material to be cut, said cutting elements being generally flush with the forward edge of said cylindrical casing during normal cutting operation, a frusto-conically shaped member secured to said cylindrical casing and tapering from the leading edge of said casing inwardly in spaced relation toward said rim member, an internal gear member mounted on said rim member coaxially with said shaft interconnected drive, motor and speed reducing means mounted within said cylindrical casing, an externally splined power shaft operatively connected to said drive means, an internally splined gear member mounted on said splined power shaft for rotation therewith, said latter gear member being adapted to drivingly engage said internal gear member mounted on said rim member, first power means adapted to axially move said stationary hub supported shaft and to move said shaft and said hub therewith rearwardly relative to the leading edge of said cylindrical casing for providing frontal access to said cutting elements, and second power means for moving said cylindrical casing forwardly in the direction of the material to be cut by said tunneling machine.

2. A tunneling machine as set forth in claim 1 in which said rim member includes a plurality of circumferentially spaced openings for communicating the space between said rim member and said frusto-conical member with the interior of said rim member, a plurality of scoop members mounted on the interior of said rim member, and a conveyor mechanism operatively disposed and extending axially within said rim and terminating proximate said struts for receiving the fragmented material collected by said scoops.

3. A tunneling machine as set forth in claim 1 in which the second power means includes a plurality of power cylinder devices symmetrically disposed about the inner surface of said cylindrical outer casing, each of said devices including a movable piston rod the axis of which is parallel to the casing axis, said piston rods being adapted to engage a suitable reaction surface whereby energization of said devices will cause said outer casing to be moved in the direction of the surface to be cut.

4. A tunneling machine as set forth in claim 1 in which the first power means includes a power cylinder device, a recess formed in the end of the non-rotating shaft remote from the rotating hub, one end of the power cylinder device being secured within said recess, said device including a piston rod, means for securing the piston rod to the stationary hub whereby energization of said device will cause the non-rotating shaft to move axially relative to the stationary hub.

5. A tunneling machine as set forth in claim 4 in which the non-rotating shaft includes a keyway forming axially spaced shoulders, a key member secured to said stationary hub and projecting within said keyway to limit axial movement of the shaft.

6. A tunneling machine as set forth in claim 1 including: a vertical beam member and a horizontal beam member engaging and supporting said stationary hub, said beam members being secured to said casing and terminating at the stationary hub.

7. A tunneling machine as set forth in claim 6 which includes bracket means supported by said beam members, said motor and speed reducing means being mounted on said bracket means.

8. A tunneling machine as set forth in claim 7 in which said motor and speed reducing means is mounted on said bracket means so as to be disposed below and to one side of said stationary hub.

9. A tunneling machine as set forth in claim 8 in which said rim member includes a plurality of circumferentially spaced openings for communicating the space between said rim member and said frusto-conical member with the interior of said rim member, a plurality of scoop members mounted on the interior of said rim member, and a conveyor mechanism supported in said casing and extending axially within said rim member and terminating proximate said struts for receiving the fragmented material collected by said scoops, said conveyor mechanism being received and disposed above and generally to the opposite side of the stationary hub relative to the motor and speed reducing means.

References Cited in the file of this patent
UNITED STATES PATENTS

| | | |
|---|---|---|
| 741,829 | Price | Oct. 20, 1903 |

FOREIGN PATENTS

| | | |
|---|---|---|
| 270,014 | Great Britain | May 5, 1927 |